US012589628B2

(12) United States Patent
Kim et al.

(10) Patent No.: US 12,589,628 B2
(45) Date of Patent: Mar. 31, 2026

(54) VEHICLE CONTROL APPARATUS AND VEHICLE CONTROL METHOD

(71) Applicants:Hyundai Motor Company, Seoul (KR); Kia Corporation, Seoul (KR)

(72) Inventors: Dae Kwang Kim, Seongnam-si (KR); Min Soo Woo, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 110 days.

(21) Appl. No.: 18/599,408

(22) Filed: Mar. 8, 2024

(65) Prior Publication Data

US 2025/0135832 A1    May 1, 2025

(30) Foreign Application Priority Data

Oct. 30, 2023    (KR) ........................ 10-2023-0146981

(51) Int. Cl.
B60H 1/00        (2006.01)
B60K 11/08        (2006.01)

(52) U.S. Cl.
CPC ..... B60H 1/00271 (2013.01); B60H 1/00735 (2013.01); B60H 1/00835 (2013.01); B60H 1/00864 (2013.01); B60K 11/085 (2013.01); B60H 2001/003 (2013.01)

(58) Field of Classification Search
CPC .. B60K 11/085; B60K 11/06; B60H 1/00271;

B60H 1/00735; B60H 1/00835; B60H 1/00864; B60H 1/00764; B60H 2001/003; B60H 2001/3266; F01P 5/02; F01P 5/06

See application file for complete search history.

(56) References Cited

U.S. PATENT DOCUMENTS

| | | | | |
|---|---|---|---|---|
| 8,667,931 | B2 * | 3/2014 | Kerns | F01P 7/10 |
| | | | | 180/68.1 |
| 10,563,564 | B2 * | 2/2020 | Schwartz | F01P 7/048 |
| 10,647,175 | B2 * | 5/2020 | Saha | B60K 11/06 |
| 2013/0036991 | A1 * | 2/2013 | Kerns | F01P 7/10 |
| | | | | 123/41.04 |
| 2017/0072783 | A1 | 3/2017 | Jeong | |

(Continued)

FOREIGN PATENT DOCUMENTS

| | | |
|---|---|---|
| JP | 2009018740 A | 1/2009 |
| KR | 20210038196 A | 4/2021 |

*Primary Examiner* — Nelson J Nieves
(74) *Attorney, Agent, or Firm* — MCDONNELL BOEHNEN HULBERT & BERGHOFF LLP

(57)    ABSTRACT

Disclosed are a vehicle control apparatus and a vehicle control method. The vehicle control apparatus may calculate a total sum of consumed power according to at least one of power consumed due to an air resistance, power consumed due to an operation of a cooling fan that increases flow of air introduced into an under-hood of a vehicle, or power consumed due to an operation of an air conditioner, or any combination thereof, and control at least one of an air flap that opens and closes an air inlet of the under-hood or a cooling fan, or any combination thereof such that the total sum of the consumed power is minimized in response to securing of a target air flow rate representing a flow rate of air required to pass through a condenser or a radiator of the air conditioner according to an operation of the vehicle.

18 Claims, 8 Drawing Sheets

(56)                    References Cited

U.S. PATENT DOCUMENTS

| | | |
|---|---|---|
| 2017/0151866 A1 | 6/2017 | Choi |
| 2018/0209324 A1* | 7/2018 | Schwartz ................ F01P 7/048 |
| 2019/0041968 A1* | 2/2019 | Hornback .............. F01P 7/165 |
| 2020/0282796 A1 | 9/2020 | Trapp |
| 2022/0056832 A1* | 2/2022 | Uppole .................... F01P 7/08 |
| 2022/0089017 A1 | 3/2022 | Kim |
| 2022/0325656 A1 | 10/2022 | Kim |

* cited by examiner

VEHICLE CONTROL APPARATUS AND VEHICLE CONTROL METHOD

CROSS-REFERENCE TO RELATED APPLICATION

This application claims the benefit of priority to Korean Patent Application No. 10-2023-0146981, filed in the Korean Intellectual Property Office on Oct. 30, 2023, the entire contents of which are incorporated herein by reference.

TECHNICAL FIELD

The present disclosure relates to a vehicle control apparatus and a vehicle control method, and more particularly, to a technology for controlling an air flap and a cooling fan.

BACKGROUND

An under-hood of a vehicle includes various heat exchangers, such as an engine, a radiator, a cooling fan, an evaporator, and a condenser. These heat exchangers cool or dissipate heat by exchanging heat with outdoor air.

The air flap that may adjust an amount of air that is introduced into an under-hood that may be opened and closed is installed on a front side of the vehicle. Furthermore, a flow rate of air to the under-hood may be adjusted by opening and closing the air flap depending on a condition and an operation condition of the vehicle.

In this regard, an active air flap (AAF) is an apparatus that controls flow of air that is introduced into an under-hood. The AAF decreases air resistance by closing the air flap to decrease the flow of the air in the under-hood when the vehicle is in a driving mode. To the contrary, when the AAF opens the air flap, the air resistance increases as the air flow in the under-hood increases.

Separately from the AAF, the cooling fan is an apparatus that further increases the flow of the air introduced into the under-hood, and the flow of the air increases depending on operation power.

Conventionally, the AAF and the cooling fans are individually controlled depending on a specific condition, and thus, power consumed to operate the AAF and the cooling fan is greater than the required flow rate of the air.

SUMMARY

The present disclosure has been made to solve the above-mentioned problems occurring in the prior art while advantages achieved by the prior art are maintained intact.

An aspect of the present disclosure provides a vehicle control apparatus and a vehicle control method, by which an optimum control degree, by which an air flap and a cooling fan may be controlled with minimum power, may be calculated by not controlling the air flap and the cooling fan independently but controlling them in association with each other.

An aspect of the present disclosure also provides a vehicle control apparatus and a vehicle control method, by which a fuel efficiency or an electricity efficiency may be improved by operating an air flap or a cooling fan with minimum energy while securing a flow rate of air that is necessary for an under-hood of a vehicle.

An aspect of the present disclosure also provides a vehicle control apparatus and a vehicle control method, by which a fuel efficiency or an electricity efficiency may be improved even energy consumption due to an air conditioner is high by controlling an air flap or a cooling fan in consideration of a load due to an operation of the air conditioner as well as a load due to an air resistance or a load due to an operation of a cooling fan.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control apparatus includes a memory that stores program instructions, and a processor that executes the program instructions, and the processor may calculate a total sum of consumed power according to at least one of power consumed due to an air resistance, power consumed due to an operation of a cooling fan that increases flow of air introduced into an under-hood of a vehicle, or power consumed due to an operation of an air conditioner, or any combination thereof, and control at least one of an air flap that opens and closes an air inlet of the under-hood or a cooling fan, or any combination thereof such that the total sum of the consumed power is minimized in response to securing of a target air flow rate representing a flow rate of air required to pass through a condenser or a radiator of the air conditioner according to an operation of the vehicle.

In an embodiment, the target air flow rate may be modeled based on a speed and a cooling requirement of the vehicle.

In an embodiment, the processor may calculate a flow rate of air introduced into the under-hood of the vehicle based on a speed of the vehicle, an opening degree of the air flap, and an rpm of the cooling fan, and control at least one of the air flap or the cooling fan, or any combination thereof such that the flow rate of the air introduced into the under-hood of the vehicle is the target air flow rate or higher.

In an embodiment, the processor may calculate the power consumed due to the air resistance based on an air density, an air resistance coefficient, an area, by which a front surface of the vehicle is projected on a plane being perpendicular to a direction, in which the vehicle travels, and a speed of the vehicle.

In an embodiment, the processor may calculate the power consumed due to the operation of the cooling fan based on an rpm of the cooling fan.

In an embodiment, the processor may calculate a refrigerant pressure based on an outdoor temperature, a flow rate of the air introduced into the under-hood of the vehicle, and an opening degree of the air flap, and calculate the power consumed due to the operation of the air conditioner based on the calculated refrigerant pressure.

In an embodiment, the processor may, based on that it is identified that at least one of the air flap or the cooling fan, or any combination thereof is not normally controlled such that the total sum of the consumed power is minimized in response to securing of the target air flow rate according to the operation of the vehicle, control at least one of the air flap or the cooling fan, or any combination thereof according to a rule-based map set based on an input signal including a speed of the vehicle, an oil temperature of an engine, or a water temperature of the engine regardless of the target air flow rate.

In an embodiment, the processor may, based on that it is identified that at least one of the air flap or the cooling fan, or any combination thereof is not normally controlled such that the total sum of the consumed power is minimized and is not normally controlled according to the rule-based map in response to securing of the target air flow rate, fix any one of a state, in which the air flap is opened, or a state, in which the air flap is closed, or fix any one of a state, in which the cooling fan is operated, and a state, in which the cooling fan is not operated.

In an embodiment, the processor may calculate power, by which the total sum of the consumed power is minimized, as preset threshold power in response to the securing of the target air flow rate, and control at least one of the air flap or the cooling fan, or any combination thereof based on the preset threshold power.

In an embodiment, the processor may control the air flap and the cooling fan in association with each other such that the total sum of the consumed power is minimized, in response to the securing of the target air flow rate while not controlling the air flap and the cooling fan independently.

According to an aspect of the present disclosure, a vehicle control method includes calculating, by a processor, a total sum of consumed power according to at least one of power consumed due to air resistance, power consumed due to an operation of a cooling fan that increases flow of air introduced into an under-hood of a vehicle, or power consumed due to an operation of an air conditioner, or any combination thereof, and controlling, by the processor, at least one of an air flap that opens and closes an air inlet of the under-hood or a cooling fan, or any combination thereof such that the total sum of the consumed power is minimized in response to securing of a target air flow rate representing a flow rate of air required to pass through a condenser or a radiator of the air conditioner according to an operation of the vehicle.

In an embodiment, the controlling, by the processor, of the at least one of the air flap that opens and closes the air inlet of the under-hood or the cooling fan, or any combination thereof such that the total sum of the consumed power is minimized in response to the securing of the target air flow rate representing the flow rate of the air required to pass through the condenser or the radiator of the air conditioner according to the operation of the vehicle may include modeling, by the processor, the target air flow rate based on a speed and a cooling requirement of the vehicle.

In an embodiment, the controlling, by the processor, of the at least one of the air flap that opens and closes the air inlet of the under-hood or the cooling fan, or any combination thereof such that the total sum of the consumed power is minimized in response to the securing of the target air flow rate representing the flow rate of the air required to pass through the condenser or the radiator of the air conditioner according to the operation of the vehicle may include calculating, by the processor, a flow rate of air introduced into the under-hood of the vehicle based on a speed of the vehicle, an opening degree of the air flap, and an rpm of the cooling fan, and controlling, by the processor, at least one of the air flap or the cooling fan, or any combination thereof such that the flow rate of the air introduced into the under-hood of the vehicle is the target air flow rate or higher.

In an embodiment, the calculating, by a processor, of the total sum of the consumed power according to the at least of the power consumed due to the air resistance, the power consumed due to the operation of the cooling fan that increases the flow of the air introduced into the under-hood of the vehicle, or the power consumed due to the operation of the air conditioner, or any combination thereof may include calculating, by the processor, the power consumed due to the air resistance based on an air density, an air resistance coefficient, an area, by which a front surface of the vehicle is projected on a plane being perpendicular to a direction, in which the vehicle travels, and a speed of the vehicle.

In an embodiment, the calculating, by a processor, of the total sum of the consumed power according to the at least of the power consumed due to the air resistance, the power consumed due to the operation of the cooling fan that increases the flow of the air introduced into the under-hood of the vehicle, or the power consumed due to the operation of the air conditioner, or any combination thereof may include calculating, by the processor, the power consumed due to the operation of the cooling fan based on an rpm of the cooling fan In an embodiment, the calculating, by a processor, of the total sum of the consumed power according to the at least of the power consumed due to the air resistance, the power consumed due to the operation of the cooling fan that increases the flow of the air introduced into the under-hood of the vehicle, or the power consumed due to the operation of the air conditioner, or any combination thereof may include calculating, by the processor, a refrigerant pressure based on an outdoor temperature, a flow rate of the air introduced into the under-hood of the vehicle, and an opening degree of the air flap, and calculating, by the processor, the power consumed due to the operation of the air conditioner based on the calculated refrigerant pressure.

In an embodiment, the vehicle control method may further include, based on that it is identified that at least one of the air flap or the cooling fan, or any combination thereof is not normally controlled such that the total sum of the consumed power is minimized in response to securing of the target air flow rate according to the operation of the vehicle, controlling, by the processor, at least one of the air flap or the cooling fan, or any combination thereof according to a rule-based map set based on an input signal including a speed of the vehicle, an oil temperature of an engine, or a water temperature of the engine regardless of the target air flow rate.

In an embodiment, the vehicle control method may further include, based on that it is identified that at least one of the air flap or the cooling fan, or any combination thereof is not normally controlled such that the total sum of the consumed power is minimized and is not normally controlled according to the rule-based map in response to securing of the target air flow rate, fixing, by the processor, any one of a state, in which the air flap is opened, or a state, in which the air flap is closed, or fixing any one of a state, in which the cooling fan is operated, and a state, in which the cooling fan is not operated.

In an embodiment, the controlling, by the processor, of the at least one of the air flap that opens and closes the air inlet of the under-hood or the cooling fan, or any combination thereof such that the total sum of the consumed power is minimized in response to the securing of the target air flow rate representing the flow rate of the air required to pass through the condenser or the radiator of the air conditioner according to the operation of the vehicle may include calculating, by the processor, power, by which the total sum of the consumed power is minimized, as preset threshold power in response to the securing of the target air flow rate, and controlling, by the processor, at least one of the air flap or the cooling fan, or any combination thereof based on the preset threshold power.

In an embodiment, the controlling, by the processor, of the at least one of the air flap that opens and closes the air inlet of the under-hood or the cooling fan, or any combination thereof such that the total sum of the consumed power is minimized in response to securing of the target air flow rate representing the flow rate of the air required to pass through the condenser or the radiator of the air conditioner according to the operation of the vehicle may include controlling, by the processor, the air flap and the cooling fan in association with each other such that the total sum of the consumed power is minimized, in response to the securing of the target air flow rate while not controlling the air flap and the cooling fan independently.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
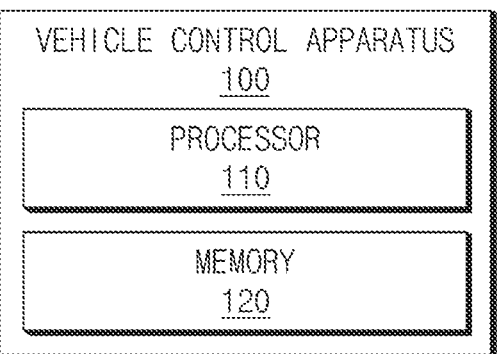
FIG. 1 is a block diagram illustrating a vehicle control apparatus according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Furthermore, the expression of "at least one of "A", "B", or "C", or any combination thereof may include all of "A" or "B" or "C", or AB or BC or AC or ABC" that are combinations thereof.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 8.

FIG. 1 is a block diagram illustrating a vehicle control apparatus according to an embodiment of the present disclosure.

According to an embodiment, a vehicle control apparatus 100 may include a processor 110 and a memory 120. A configuration of the vehicle control apparatus 100 illustrated in FIG. 1 is illustrative and the embodiments of the present disclosure are not limited thereto. For example, the vehicle control apparatus 100 may further include components not illustrated in FIG. 1.

According to an embodiment, the memory 120 may store commands or data. For example, the memory 120 may store one instruction or two or more instructions that, when being executed by the processor 110, cause the vehicle control apparatus 100 to perform various operations.

According to an embodiment, the memory 120 may be implemented as a single chipset with the processor 110 and may store various information related to the vehicle control apparatus 100. For example, the memory 120 may store information on an operation history of the processor 110.

According to an embodiment, the memory 120 may include a non-volatile memory (a read only memory (ROM)) and a volatile memory (a random access memory (RAM)). For example, power consumed due to an air resistance calculated by the processor 110, power consumed due to an operation of the cooling fan that increases a flow of air that is introduced into an under-hood of the vehicle, power consumed due to an operation of the air conditioner, or a total sum of consumed powers thereof may be stored in the memory 120.

According to an embodiment, the processor 110 may calculate the power due to the air resistance, the power consumed due to the operation of the cooling fan that increases the flow of the air introduced into the under-hood of the vehicle, the power consumed due to the operation of the air conditioner, or the consumed power due to at least one of any combination thereof.

According to an embodiment, the power consumption calculated by the processor 110 may include work done per unit time. For example, the unit of power consumption may be expressed as watt (W), and 1 W may mean power when one joule of work is done in one second.

According to an embodiment, the power consumed due to the air resistance may include power that is consumed by the vehicle due to air resistance that is received while the vehicle travels.

For example, the power consumed due to the air resistance may include the power consumption that varies due to a change in the air resistance according to the operation of the air flap. Furthermore, it may include power consumption that varies due to a change in the air resistance according to the operation of the AAF.

According to an embodiment, the processor 110 may calculate the power consumed due to the air resistance based on an air density, an air resistance coefficient, and an area, by which a front surface of the vehicle is projected on a plane that is perpendicular to a direction, in which the vehicle travels, and a speed of the vehicle.

For example, the power $P_{driving}$ consumed due to the air resistance may be calculated by Equation 1 below.

$$P_{driving} = F \cdot v = (0.5\rho C_d A v^2) \cdot v \qquad \text{[Equation 1]}$$

In Equation 1, F may be defined as a drag force (an air resistance force) applied when the vehicle travels, and v may be defined as the speed of the vehicle. Furthermore, p may be defined by the air density, Ca may be defined as the air resistance coefficient, and A may be defined as the area, by which the front surface of the vehicle is projected on a plane perpendicular to the direction, in which the vehicle travels.

For example, the air density is a mass per unit volume of the atmosphere of the earth, and may be maintained at 1.29 g/l under a condition of 0 degrees Celsius and 1 atmospheric pressure.

For example, the air resistance coefficient is a numerical representation of the air resistance and may include a drag coefficient. The air resistance coefficient may be measured in decimal units in a range of 0 to 1. As less air resistance is received, the lower air resistance coefficient is measured. As a detailed example, the air resistance coefficient may be determined by an external design of the vehicle. The air resistance coefficient may vary depending on an opening degree of the air flap.

For example, the area, by which the front surface of the vehicle is projected on the plane that is perpendicular to the direction, in which the vehicle travels, may include an area that is formed when the vehicle is projected on a plane that is perpendicular to the ground. As another example, the area, by which the front surface of the vehicle is projected on a plane that is perpendicular to the direction, in which the vehicle travels, may be calculated by a product of a height and a width of the vehicle.

For example, the speed of a vehicle may include a speed that is measured by using an rpm of the wheels. As a detailed example, it may be calculated by additionally multiplying a value obtained by multiplying a circumference length of a tire by the rpm of the tire and 60. As another example, the speed of the vehicle may be measured by using global positioning system (GPS) data.

According to an embodiment, the power consumed due to the operation of the cooling fan may include power that is consumed to forcibly supply cooling air to the radiator of the vehicle.

According to an embodiment, the processor 110 may calculate the power consumed due to the operation of the cooling fan based on the rpm of the cooling fan.

For example, the power $(P_{fan})$ consumed due to the operation of a cooling fan may be calculated by using Equation 2 below.

$$P_{fan} = f(N_{fan}) \qquad \text{[Equation 2]}$$

In Equation 2, $N_{fan}$ may be defined as the rpm of the cooling fan. Here, $N_{fan}$ may be replaced with a duty that controls the operation of the cooling fan.

For example, the power $(P_{fan})$ consumed due to the operation of the cooling fan may be modeled by a functional equation for the rpm of the cooling fan.

For example, the rpm $(N_{fan})$ of the cooling fan may be calculated based on the rotational speed of the cooling fan. As another example, the rpm of the cooling fan may be measured through a sensor.

According to an embodiment, the processor 110 may calculate a refrigerant pressure based on a flow rate of air that is introduced into the under-hood of the vehicle and the opening degree of the air flap.

For example, the refrigerant pressure $(P_{refrigerant})$ may be calculated by Equation 3 below.

$$P_{refrigerant} = f(T_{amb}, m'_{air}, \gamma_{AAF}) \qquad \text{[Equation 3]}$$

In Equation 3, $T_{amb}$ may be defined as an outdoor temperature, m'air may be defined as the flow rate of the air, and Y AAF may be defined as the opening degree of the air flap.

For example, the refrigerant pressure $(P_{refrigerant})$ may be modeled by a functional equation for the outdoor air temperature, the air flow rate, and the opening degree of the air flap. As a detailed example, the refrigerant pressure may increase as the outdoor temperature increases. Furthermore, the refrigerant pressure may be lowered as the air flow rate increases, and the larger the opening degree of the air flap is, the lower it may become.

For example, the air flow rate $(m'_{air})$ may include a mass flow rate of the air. The mass flow rate may mean a mass of an object that flows per unit time, and accordingly, the mass flow rate of the air may correspond to the mass of air that is introduced in per unit time.

For example, the opening degree $(\gamma_{AAF})$ of the air flap is a degree, by which the air flap is opened, and may include an opening amount of the air flap. As the opening degree of the air flap increases, the flow rate of the air that passes through an air inlet of the under-hood may increase.

For example, an opening degree of an air flap may be determined by various methods. For example, when the air flap is opened and closed through rotation thereof, the opening degree of the air flap may be determined depending on a rotation angle. As another example, the opening degree of the air flap may be determined depending on the flow rate of the air that passes through the opening and closing of the air flap.

For example, the outdoor air temperature $(T_{amb})$ may include a temperature of the outdoor air of the vehicle, and may be measured by an outdoor temperature sensor.

According to an embodiment, the processor 110 may calculate the power consumed due to the operation of the air conditioner based on the calculated refrigerant pressure.

For example, the power $(P_{A/C})$ consumed due to the operation of the air conditioner may be calculated by Equation 4 below.

$$P_{A/C} = f(P_{refrigerant}) \qquad \text{[Equation 4]}$$

In Equation 4, $P_{refrigerant}$ may be defined as the calculated refrigerant pressure. For example, the power $(P_{A/C})$ consumed due to the operation of an air conditioner may be modeled by a functional equation for refrigerant pressure.

For example, as the refrigerant pressure increases, the power $(P_{A/C})$ consumed due to the operation of the air conditioner may also increase. Accordingly, the power ($P_{A/C}$) consumed due to the operation of the air conditioner may increase as the outdoor temperature rises. Furthermore, the power ($P_{A/C}$) consumed due to the operation of the air conditioner may decrease as the flow rate of the air increases, and may decrease as the opening degree of the air flap increases.

According to an embodiment, the processor 110 may calculate a total sum of the power due to the air resistance, the power consumed due to the operation of the cooling fan of increasing the flow of the air introduced into the under-hood of the vehicle, and the power consumed due to the operation of the air conditioner.

For example, the total sum (J) of power consumption may be calculated by Equation 5 below.

$$J = \sum_{k=0}^{n-1} P_{driving,k} + P_{fan,k} + P_{A/C} \qquad \text{[Equation 5]}$$

In Equation 5, J is defined as the total sum of the power ($P_{driving}$) consumed due to the air resistance, the power ($P_{fan}$) consumed due to the operation of the cooling fan of increases the flow of air introduced into the under-hood of the vehicle, and the power ($P_{A/C}$) consumed due to the operation of the air conditioner.

According to an embodiment, the processor 110 may control at least one of the air flap that opens and closes of the under-hood, or the cooling fan, or any combination thereof to minimize the total sum of the power consumption in response to securing of the target air flow rate that represents the flow rate the air that is required to pass through the condenser or the radiator of the air conditioner according to the operation of the vehicle.

The processor 110 may calculate a target air flow rate that represents the flow rate of the air that is required to pass through the condenser or the radiator of the air conditioner according to the operation of the vehicle. The target air flow rate may include the flow rate of the air that is necessary to cool the heat generated from the engine of the vehicle.

For example, the target air flow rate may be determined by a modeled formula or a rule-based map. As a detailed example, the processor 110 may model the target air flow rate based on the speed or the cooling requirement of the vehicle or the like.

As another example, the target air flow rate may be calculated from a target air speed. In detail, the target air flow rate may be calculated as a value obtained by multiplying the target air speed and a cross-sectional area. Furthermore, the target air speed may be calculated based on a distance or a volume per unit time. Furthermore, the target air speed may be calculated by a mass per unit time in consideration of the air density.

According to an embodiment, the processor 110 may control the air flap or the cooling fan to secure the target air flow rate. For example, the air flap may include a device that opens and closes an air inlet of the under-hood. As another example, the air flap may include a device that opens and closes a front grill of the vehicle.

According to an embodiment, the processor 110 closes the air flap to prevent outdoor air from passing through the condenser or the radiator of the air conditioner by blocking the outdoor air from passing through the condenser or the radiator of the air conditioner, or opening the air flap. Additionally, the processor 110 may control an amount of the outdoor air that passes by adjusting the opening degree of the air flap.

According to an embodiment, the processor 110 may control the air flap through an active air flap (AAF). The AAF may include a device that controls the flow of the air introduced into the under-hood.

According to an embodiment, the processor 110 may control the air flap or the cooling fan to minimize the total sum of the power consumption while securing the target air flow rate.

The processor 110 calculate an optimum control degree, by which a control to minimize the total sum of the power consumed due to the air resistance, the power consumed due to the operation of the cooling fan, and the power consumed due to the operation of the air conditioner may be performed while the target air flow rate is secured. Here, the control degree (controlled variable) may mean an amount or a variable that is necessary to control a control target.

For example, the processor 110 may calculate the air flow rate required to be introduced into the under-hood of the vehicle as the target air flow rate, based on the driving speed and the cooling requirement of the vehicle, and may control the air flap or the cooling fan such that the corresponding target air flow rate may pass therethrough. Then, for example, the processor 110 may determine the optimum control degree, by which the total sum of the power consumed due to the air resistance calculated depending on the opening degree of the air flap and the power consumed due to the operation of the cooling fan may be minimized.

Furthermore, for example, when the vehicle travels while the air conditioner is operated, the power consumed due to the operation of the air conditioner may also be included in the total sum of the power consumption.

As a detailed example, the optimum control degree may be determined by calculating the opening degree of the air flap and the rotational speed of the cooling fan, by which the power consumption may be minimized while the target air flow rate is secured.

According to an embodiment, the processor 110 may calculate the flow rate of the air introduced into the under-hood of the vehicle based on the speed of the vehicle, the opening degree of the air flap, and the rpm of the cooling fan. For example, data on the air flow rate that may be introduced into the under-hood of the vehicle depending on the speed of the vehicle, the opening degree of the air flap, and the rpm of the cooling fan may be stored in the memory 120 or the system. In this case, the processor 110 provides data on the air flow rate stored in the memory 120 or the system based on the current speed of the vehicle, the opening degree of the air flap, and the rpm of the cooling fan to calculate the flow rate of the air introduced into the under-hood of the vehicle. As another example, the flow rate of the air introduced into the under-hood of the vehicle may be calculated through the speed of the air. As another example, it may be calculated through a sensor that may measure the speed or the flow rate of the air introduced into the under-hood of a vehicle.

According to an embodiment, the processor 110 may control at least of the air flap or the cooling fan, or any combination thereof such that the flow rate of the air introduced into the under-hood of the vehicle is equal to or higher than the target air flow rate. For example, the processor 110 may control the air flap or the cooling fan such that the air corresponding to the target air flow rate is introduced into the under-hood of the vehicle.

According to an embodiment, the processor 110 may determine whether the air flap and the cooling fan are normally operated in association with each other. For example, it may determine whether the air flap and the cooling fan are operated organically to secure the target air flow rate. For example, the processor 110 may determine whether the air flap and the cooling fan are normally controlled in association with each other to minimize the total sum of the power consumption while securing the target air flow rate according to the operation of the vehicle.

According to an embodiment, the processor 110 may control at least one of the air flap or the cooling fan, or any combination thereof according to a rule-based map regardless of the target air flow rate when at least one of the air flip or the cooling fan, or any combination thereof is not normally controlled, to minimize the total sum of the power consumption in response to securing of the target air flow rate according to the operation of the vehicle. Then, the rule-based map may be set based on an input signal including the speed of the vehicle, the oil temperature of the engine, or the water temperature of the engine.

For example, when the processor 110 controls the air flap or the cooling fan according to a rule-based map, the processor 110 may control the air flap to be closed at a vehicle speed of a specific speed or higher regardless of the flow rate of the air in the under-hood.

As another example, the processor 110 may control the air flap to be closed to raise the oil temperature of the engine or the water temperature of the engine during a cold start when the processor 110 controls the air flap or the cooling fan according to the rule-based map.

As another example, when the processor 110 controls the air flap or the cooling fan according to the rule-based map, the processor 110 may control the air flap to be opened when the oil temperature of the engine or the water temperature of the engine is a specific temperature or higher.

As another example, when the processor 110 controls the air flap or the cooling fan according to the rule-based map, the processor 110 may perform a control such that a rotational speed of the cooling fan is increased when the oil temperature of the engine or the water temperature of the engine is a specific temperature or higher regardless of the flow rate of the air in the under-hood.

As another example, when the processor 110 controls the air flap or the cooling fan according to the rule-based map, it may operate the cooling fan at a constant speed regardless of the flow rate of the air in the under-hood.

In this way, the processor 110 may control the air flap or the cooling fan according to the rule-based map regardless of the target air flow rate when the air flap and the cooling fan are not normally controlled in association with each other to minimize the total sum of power consumption, in response to the securing of the target air flow rate according to the operation of the vehicle.

According to an embodiment, the processor 110 may determine whether at least one of the air flap or the cooling fan, or any combination thereof is normally controlled according to the rule-based map. For example, when the air flap or the cooling fan is not operated according to the rule-based map even though a condition based on the rule-based map is satisfied, the processor 110 may determine that the air flap or the cooling fan is not normally controlled according to the rule-based map.

According to an embodiment, the processor 110 may control the air flap or the cooling fan to the safety mode when at least one of the air flap, or the cooling fan, or any combination thereof is not normally controlled such that the total sum of the power consumption is minimized, and is not normally controlled according to the rule-based map in response to the securing of the target air flow rate.

For example, the processor 110 may determine that there is a problem with the control of the air flap or the cooling fan when the air flap and the cooling fan are not normally controlled in association with each other such that the total sum of the power consumption is minimized while the target air flow rate is secured and they are not normally controlled according to the rule-based map.

In this case, the processor 110 may perform a control in the safety mode for fixing the air flap in any one of an opened state or a closed state, or fixing the cooling fan in any one of a state, in which the cooling fan is operated, or a state, in which the cooling fan is not operated.

For example, the processor 110 may maintain a state, in which the air flap is opened, or operate the cooling fan at a constant speed regardless of the target air flow rate or the rule-based map. The processor 110 may control the air flap or the cooling fan in a safety mode, in which heat in an interior of the engine or the under-hood may be cooled down for safety even though energy is unnecessarily consumed due to an increase in the air resistance or an increase in the total sum of the power consumption.

According to an embodiment, the processor 110 may calculate the power that minimizes the total sum of the power consumption as preset threshold power in response to the securing of the target air flow rate. For example, the processor 110 may calculate power, by which the total sum of the power consumed due to the air resistance, the power consumed due to the operation of the cooling fan, and the power consumed due to the operation of the air conditioner is minimized, as threshold power. Then, the threshold power may be set in advance based on the speed and the cooling requirement of the vehicle.

For example, the processor 110 may control the air flap or the cooling fan with a preset threshold power based on the speed and the cooling requirement of the vehicle. Then, the preset threshold power may be calculated as the optimum control degree. In detail, the optimum control degree calculated by the processor 110 may include an opening degree of the air flap and a rotational speed of the cooling fan, which are set to correspond to the threshold power. The processor 110 may control the opening degree of the air flap and the rotational speed of the cooling fan in association with each other according to the optimum control degree.

According to an embodiment, the processor 110 may control the air flap and the cooling fan in association with each other to minimize the total sum of the power consumption in response to the securing of the target air flow rate while not controlling the air flap and the cooling fan independently of each other.

When the air flap and the cooling fan are controlled independently of each other, air, a flow rate of which is more than the target air flow rate may be introduced into the under-hood of the vehicle, and in this case, a fuel efficiency or an electricity efficiency may decrease as unnecessary power is consumed.

For example, when the air flap or the cooling fan is controlled independently, an operation degree of the active air flap (AAF) may be determined to secure the necessary flow rate of the air, and the operation degree of the cooling fan may be determined accordingly. Accordingly, the air resistance may increase unnecessarily and more energy than necessary may be consumed.

Accordingly, the processor 110 may calculate the optimum control degree, by which the flow rate of air introduced into the under-hood of the vehicle may correspond to the target air flow rate by controlling the air flap and the cooling fan in association with each other. For example, the processor 110 may secure the target air flow rate with a minimum power consumption by controlling the opening degree of the air flap and the rotational speed of the cooling fan based on the optimum control degree.

Figure 2:
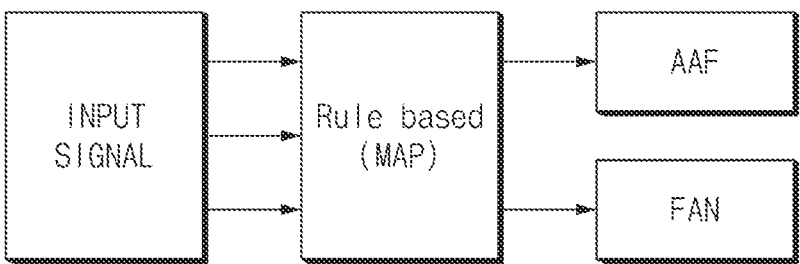
FIG. 2 is a block diagram illustrating an example of an AAF and an FAN being controlled according to a rule-based map as a conventional technology.

FIG. 2 is a block diagram illustrating an example of the AAF and the FAN being controlled according to the rule-based map as a conventional technology.

According to an embodiment, according to the conventional technology, the active air flap (AAF) and the cooling fan (FAN) may be controlled based on the rule-based map. For example, when receiving an input signal, the processor may perform a control corresponding to the input signal based on the rule-based map.

For example, the input signal may include various signals, such as a speed of the vehicle, an oil temperature of the engine, a water temperature of the engine, and a temperature of an interior of the under-hood.

For example, the rule-based map may include a control degree of the AAF or the cooling fan, which is determined depending on the input signal. As a detailed example, the rule-based map may include the control degree, by which the air flap may be closed to raise the oil temperature of the engine or the water temperature of the engine during a cold start. Accordingly, the processor may perform a control to open the air flap based on the control degree by the rule-based map.

As another detailed example, the rule-based map may include a control degree, by which the cooling fan may be operated at a specific rotational speed when a temperature of the engine room is higher than a specific temperature.

According to the conventional technology according to the embodiment of FIG. 2, when the processor controls the AFF and the cooling fan based on a rule base, the AAF and the cooling fan may be independently controlled regardless of the flow rate of the air, which is required for cooling the engine room whereby the fuel efficiency or the electricity efficiency may decrease.

Figure 3:
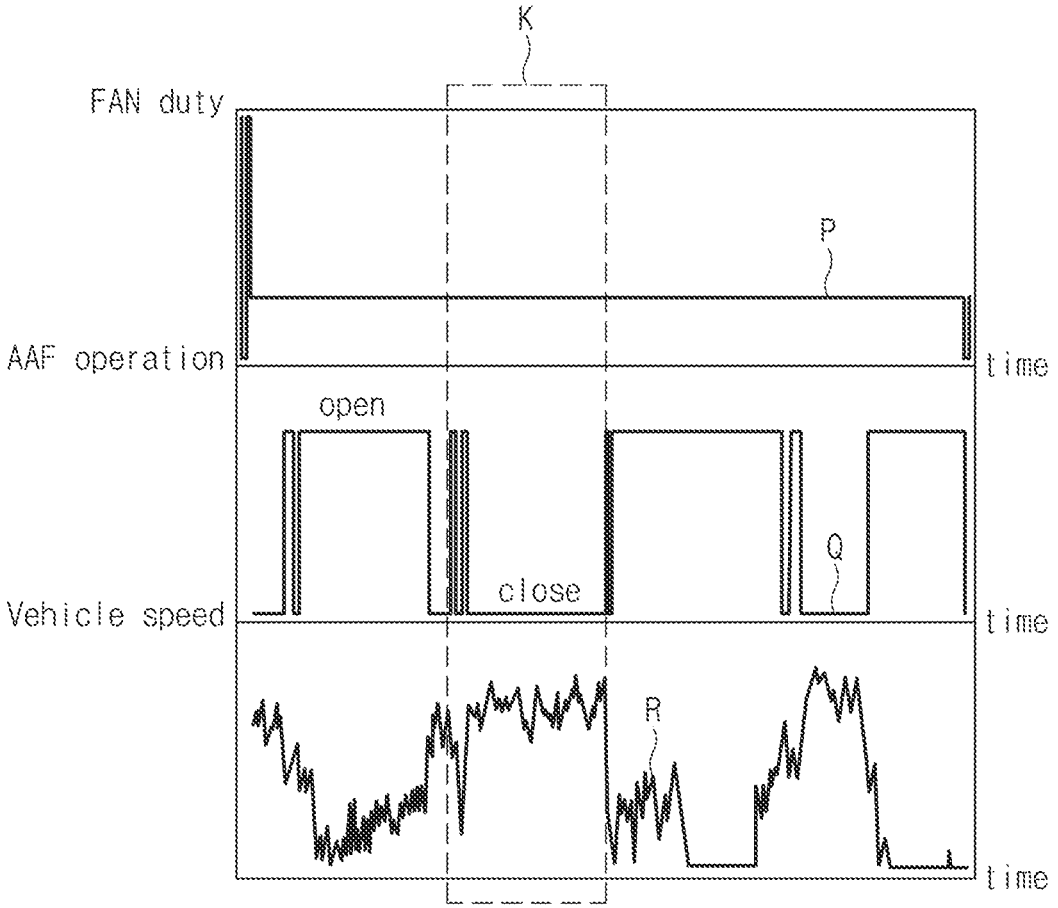
FIG. 3 is a graph illustrating an example an AAF being controlled to be closed at some vehicle speeds even though the air conditioner is operated when an AAF and an FAN are controlled according to a rule-based map.

FIG. 3 is a graph illustrating an example of performing a control to close the AAF in some vehicle speeds even though the air conditioner is operated when the AAF and the FAN are controlled according to the rule-based map.

According to an embodiment, graph P is a graph that depicts a duty (FAN duty) of the cooling fan, graph Q is a graph that depicts an operation of the air flap (AAF), and graph R is a graph that depicts a speed of the vehicle over time. Here, the time axes of graph P and graph Q may correspond to the time axis of graph R corresponding to a speed graph of the vehicle.

According to an embodiment, when the AAF and the FAN are controlled according to the rule-based map, the air flap or the cooling fan (FAN) may be controlled regardless of the required flow rate of the air. In this case, the processor may individually control the air flap and the cooling fan.

For example, referring to graph P, the cooling fan may be operated with a constant FAN duty. As a detailed example, the cooling fan may be operated at a constant FAN duty or at a constant rotational speed regardless of the vehicle speed, and accordingly, energy for operating the cooling fan may be consumed regardless of the vehicle speed.

For example, graph Q may depict that the air flap is opened or closed. As a detailed example, when the Y-axis of graph Q has a value of 1 or 0, a state, in which the air flap is opened, may be indicated by a value of 1 on the Y-axis, and the state, in which the air flap is closed, may be indicated by a value of 0 on the Y-axis. In this case, the operation graph of the air flap over time may appear as graph Q.

For example, graph R may depict the speed of the vehicle over time.

According to an embodiment, referring to graph P in correspondence to graph R related to the speed of the vehicle, when the processor controls the air flap or the cooling fan according to the rule-based map, the cooling fan is operated at a constant duty regardless of the speed of the vehicle. In this case, the air resistance or the flow rate of the air introduced into the under-hood of the vehicle may vary depending on a change in the speed of the vehicle, and unnecessary energy may be consumed by operating the cooling fan regardless of the flow rate of the air flowing into the under-hood.

According to an embodiment, referring to graph Q in correspondence with graph R related to the speed of the vehicle, it may be seen that the air flap is controlled to be opened in a section, in which the speed of the vehicle is low, and the air flap is controlled to be closed in a section, in which the speed of the vehicle is high. In this case, the air flap is opened or closed based only on the speed of the vehicle, and thus, heat dissipation due to the operation of the cooling fan may not be performed properly.

According to an embodiment, the rule-based map may include a control degree, by which the air flap may be closed when the speed of the vehicle is higher a certain speed and opening the air flap when the speed of the vehicle is lower than the certain speed. Accordingly, the processor may perform a control for closing the air flap based on the control degree based on a rule-based map when the speed of the vehicle is higher than a specific speed.

For example, referring to section K of FIG. 3, when the speed of the vehicle is high, the cooling fan may be operated constantly even though the air flap is closed. In this case, as the speed of the vehicle increases, the oil temperature of the engine or the water temperature of the engine may also increase, and the air flap may remain closed even when the cooling fan is operated to cool the oil temperature of the engine or the water temperature of the engine whereby heat may not be properly dissipated.

Accordingly, it is necessary to increase an energy efficiency, such as a fuel efficiency or an electricity efficiency, by controlling the air flap or the cooling fan according to the target air flow rate required to cool the temperature of the engine while not controlling the air flap or the cooling fan simply with the rule-based map.

Figure 4:
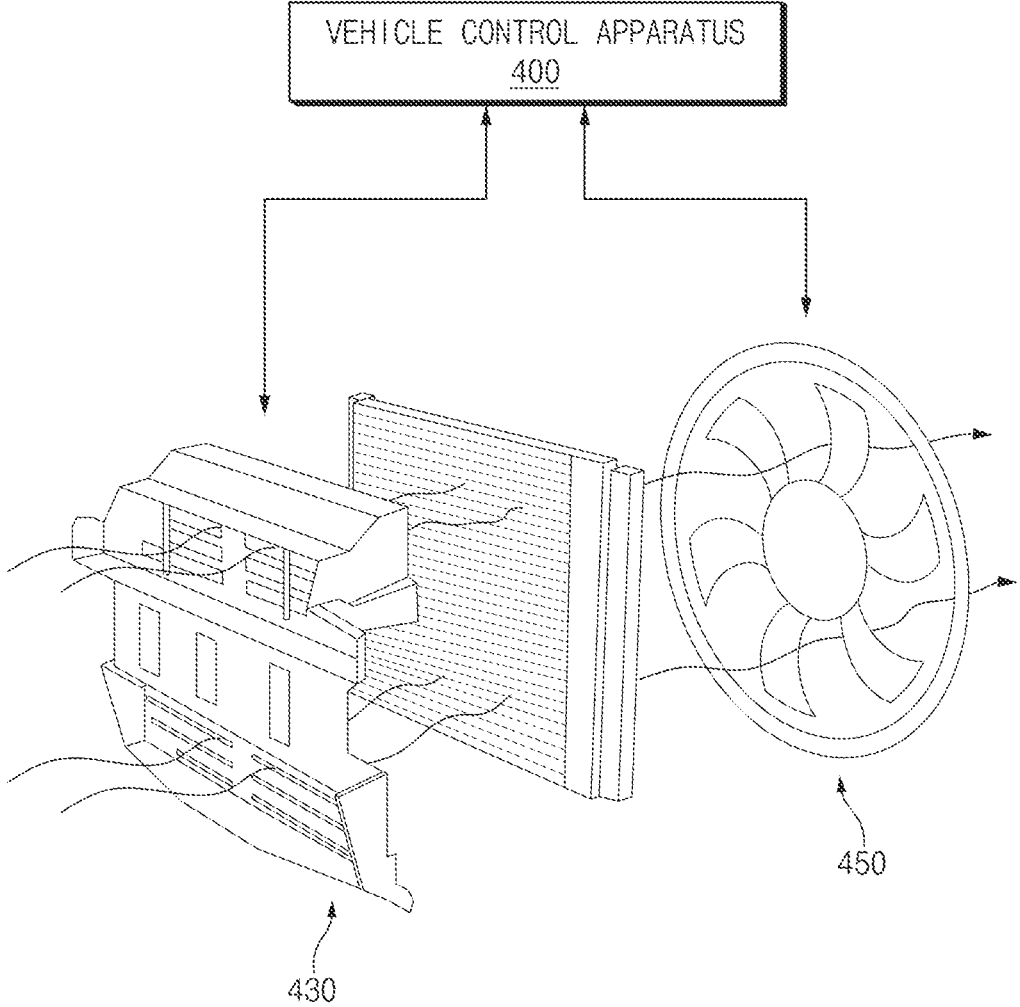
FIG. 4 is a conceptual view illustrating an example of, a vehicle control apparatus, controlling an AAF and a cooling fan according to an embodiment of the present disclosure.

FIG. 4 is a conceptual view illustrating an example of the vehicle control apparatus controlling the AAF and the cooling fan according to an embodiment of the present disclosure.

According to an embodiment, a vehicle control apparatus 400 may include a processor that controls an AAF 430 and a cooling fan 450. The processor of the vehicle control apparatus 400 may control the AAF 430 and the cooling fan 450.

According to an embodiment, the AAF 430 may include the air flap that opens and closes the air inlet of the under-hood. The air flap may be provided in a grill of the vehicle, or may be located on the rear surface of the grill of the vehicle.

According to an embodiment, the cooling fan 450 is a device for increasing the flow of the air introduced into the under-hood, and the processor may control the rotational speed, the rpm, or the like of the cooling fan 450.

Referring to FIG. 4 according to an embodiment, the processor may control the AAF 430 and the cooling fan 450 to minimize the total sum of the power consumed due to the air resistance depending on the opening/closing of the air flap, the power consumed due to the operation of the cooling fan, and the power consumed due to the operation of the air conditioner while securing a target air flow rate indicating the air flow rate required to pass through the condenser or radiator of the air conditioner according to the operation of the vehicle.

Figure 5:
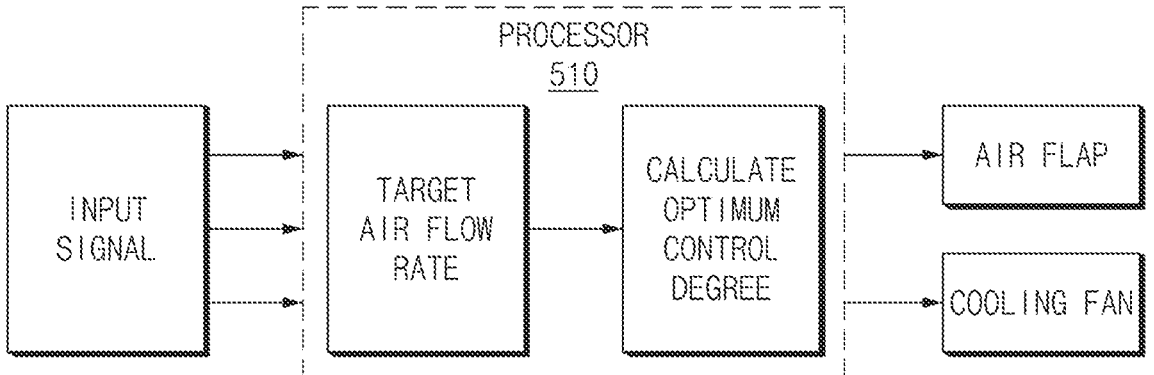
FIG. 5 is a block diagram illustrating an example of, a vehicle control apparatus according to an embodiment of the present disclosure, controlling an air flap or a cooling fan according to an optimum control degree, by which a target air flow rate with a minimum power consumption may be secured.

FIG. 5 is a block diagram illustrating an example of, the vehicle control apparatus according to an embodiment of the present disclosure, controlling the air flap or the cooling fan according to the optimum control degree, by which the target air flow rate may be secured with a minimum power consumption.

According to an embodiment, a processor 510 may calculate an optimum control degree, by which the air flap or the cooling fan may be controlled to minimum energy based on the input signal including the speed of the vehicle, the oil temperature of the engine, or the water temperature of the engine, and may control the air flap or the cooling fan depending on the optimum control degree.

According to an embodiment, the processor 510 may calculate the target air flow rate based on the input signal including the speed of the vehicle, the oil temperature of the engine, or the water temperature of the engine. For example, the processor 510 may model the target air flow rate based on the speed and the cooling requirement of the vehicle. Here, the target air flow rate may include the flow rate of the air that is required to pass through the condenser or the radiator of the air conditioner depending on the operation of the vehicle. Alternatively, it may include the flow rate of the air, which is required to cool down the heat of components in the under-hood of the vehicle or the engine of the vehicle.

According to an embodiment, the processor 510 may calculate the optimum control degree, by which the air flap or the cooling fan may be controlled with minimum energy while securing the target air flow rate.

For example, the optimum control degree may include a control degree, by which the total sum of the power consumed due to the air resistance, the power consumed due to the operation of the cooling fan, and the power consumed due to the operation of the air conditioner is controlled to be minimized.

For example, the optimum control degree may include a control degree, by which the sum of the control degree of the air flap and the control degree of the cooling fan required to secure the target air flow rate is minimized. Therefore, a ratio of the control degree of the air flap and the control degree of the cooling fan may vary depending on the speed and the cooling requirement of the vehicle.

According to an embodiment, the processor 510 may calculate a combination of the opening degree of the air flap and the rotational speed of the cooling fan to introduce the air corresponding to the target air flow rate into the under-hood of the vehicle. Furthermore, the processor 510 may calculate, among the control degrees of the combinations of the opening degree of the air flap and the rotational speed of the cooling fan, a control degree of a combination, by which the total sum of the power consumed due to the air resistance, the power consumed by the operation of the cooling fan, and the power due to the operation of the air conditioner is minimized, as an optimum control degree.

Accordingly, the processor 510 may operate the air flap based on the control degree of the air flap included in the optimum control degree, and may operate the cooling fan based on the control degree of the cooling fan included in the optimum control degree.

Referring to FIG. 5 according to an embodiment, the fuel efficiency or the electricity efficiency may be improved by operating the air flap or the cooling fan with minimum energy while the air flow rate required for the under-hood is secured.

Hereinafter, a vehicle control method according to an embodiment of the present disclosure will be described in detail with reference to FIG. 6.

Figure 6:
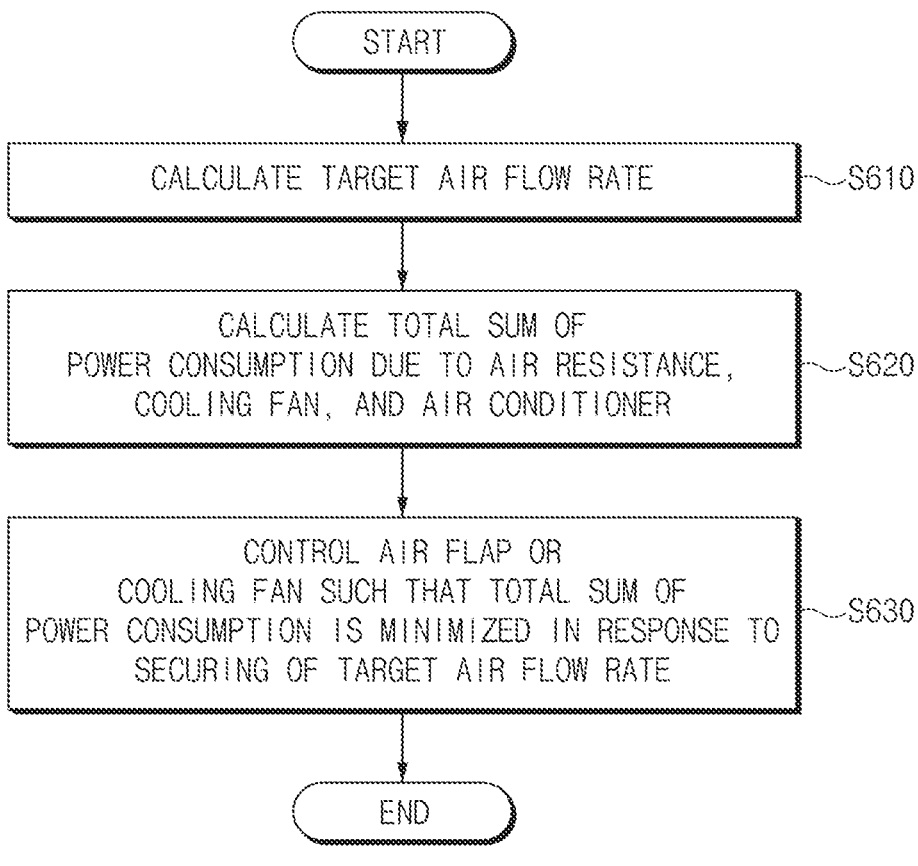
FIG. 6 is a flowchart illustrating a vehicle control method according to an embodiment of the present disclosure.

FIG. 6 is a flowchart illustrating the vehicle control method according to an embodiment of the present disclosure.

Hereinafter, it is assumed that the vehicle control apparatus 100 of FIG. 1 performs a process of FIG. 6. Furthermore, in a description of FIG. 6, operations described as being performed by the apparatus may be understood as being controlled by the processor 110 of the vehicle control apparatus 100.

According to an embodiment, the processor may calculate the target air flow rate that represents the flow rate of the air required to pass through the condenser or the radiator of the air conditioner according to the operation of the vehicle (S610). For example, the target air flow rate may be determined by a modeled formula or a rule-based map. As a detailed example, the processor may model the target air flow rate based on the speed and the cooling requirement of the vehicle.

According to an embodiment, the processor may calculate the total sum of the power consumed due to the air resistance, the power consumed due to the operation of the cooling fan, and the power consumed due to the operation of the air conditioner (S620).

For example, the processor may calculate the power consumed due to the air resistance based on the air density, the air resistance coefficient, the area, by which the front surface of the vehicle is projected on the plane that is perpendicular to the direction, in which the vehicle travels, and the speed of the vehicle.

For example, the processor may calculate the power consumed due to the operation of the cooling fan based on the rpm of the cooling fan.

For example, the processor may calculate the power consumed due to the operation of the air conditioner based on the flow rate of air introduced into the under-hood of the vehicle and the refrigerant pressure calculated based on the opening degree of the air flap.

According to an embodiment, the processor may control the air flap and the cooling fan to minimize the total sum of power consumption in response to the securing of the target air flow rate (S630).

For example, the processor may model the target air flow rate based on the speed and the cooling requirement of the vehicle.

For example, the processor may calculate the power, by which the total sum of power consumption is minimized, as a preset threshold power in response to the securing of the target air flow rate. Furthermore, the processor may control at least one of the air flap or the cooling fan, or any combination thereof based on preset threshold power.

According to an embodiment, the processor does not control the air flap and the cooling fan independently of each other, but may control the air flap and the cooling fan in association with each other to minimize the total sum of the power consumption in response to the securing of the target air flow rate whereby the fuel efficiency or the electricity efficiency may be improved.

Figure 7:
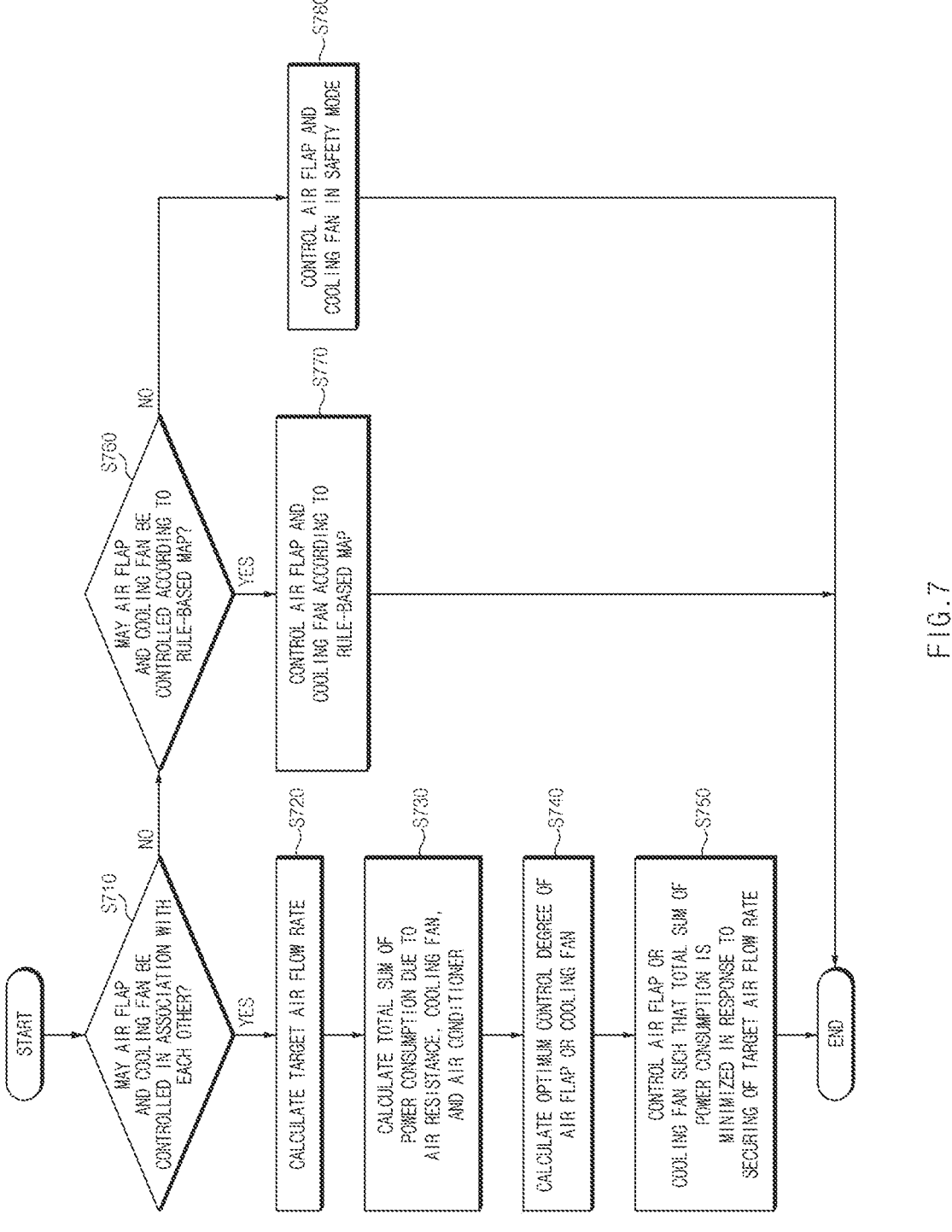
FIG. 7 is a flowchart illustrating a method for controlling an air flap and a cooling fan in association with each other, controlling the air flap and the cooling fan according to a rule-based map, or controlling the air flap and the cooling fan in a safety mode, based on whether the air flap and the cooling fan are normally operated in a vehicle control method according to an embodiment of the present disclosure.

FIG. 7 is a flowchart illustrating a method for controlling the air flap and the cooling fan in association with each other, controlling the air flap and the cooling fan according to the rule-based map, or controlling the air flap and the cooling fan in the safety mode, based on whether the air flap and the cooling fan are normally operated in the vehicle control method according to an embodiment of the present disclosure.

According to an embodiment, the processor may determine whether the air flap and the cooling fan may be normally operated in association with each other (S710). For example, it may determine whether the air flap and the cooling fan may be operated organically to secure the target air flow rate. For example, the processor may determine whether the air flap and cooling fan may be normally controlled in association with each other to minimize the total sum of the power consumption while securing the target air flow rate according to the vehicle operation.

According to an embodiment, when determining that the air flap and the cooling fan may be normally operated in association with each other (S710, YES), the processor may calculate the target air flow rate that represents the required flow rate of the air that passes through the condenser or the radiator of the air conditioner depending on the operation of the vehicle (S720). As a detailed example, the processor may model the target air flow rate based on the speed and the cooling requirement of the vehicle.

According to an embodiment, the processor may calculate the total sum of the power consumed due to the air resistance, the power consumed due to the operation of the cooling fan, and the power consumed due to the operation of the air conditioner (S730).

According to an embodiment, the processor may calculate the optimum control degree, by which the air flap or the cooling fan may be controlled with minimum energy while securing the target air flow rate (S740). The optimum control degree may include a control degree, by which the total sum of the power consumed due to the air resistance, the power consumed due to the operation of the cooling fan, and the power consumed due to the operation of the air conditioner is minimized. For example, the optimum control degree may include a control degree, by which the sum of the control degree of the air flap and the control degree of the cooling fan required to secure the target air flow rate is minimized. Accordingly, the ratio of the control degree of the air flap and the control degree of the cooling fan may vary depending on the speed and the cooling requirement of the vehicle.

According to an embodiment, the processor may calculate a combination of the opening degree of the air flap and the rotational speed of the cooling fan for introducing the air corresponding to the target air flow rate into the under-hood of the vehicle. Furthermore, the processor may calculate the control degrees of the combinations of the opening degree of the air flap and the rotational speed of the cooling fan, the control degree of the combination, by which the total sum of the power consumed due to the air resistance, the power consumed due to the operation of the cooling fan, and the power consumed due to the operation of the air conditioner is minimized, as the optimum control degree.

According to an embodiment, the processor may control the air flap and the cooling fan to minimize the total sum of the power consumption in response to the securing of the target air flow rate (S750).

For example, the processor may operate the air flap based on the control degree of the air flap included in the optimum control degree, and may operate the cooling fan based on the control degree of the cooling fan included in the optimum control degree.

According to an embodiment, when determining that the air flap and the cooling fan cannot be normally operated in association with each other (S710, NO), the processor may determine whether the air flap or the cooling fan may be normally controlled according to the rule-based map regardless of the target air flow rate (S760). Then, the rule-based map may be set based on the input signal including the speed of the vehicle, the oil temperature of the engine, or the water temperature of the engine.

According to an embodiment, when the air flap or the cooling fan may be normally controlled according to the rule-based map regardless of the target air flow rate (S760, YES), the processor may control the air flap or the cooling fan according to the rule-based map (S770).

For example, the processor may control the air flap to be closed at a vehicle speed of a specific speed or higher regardless of the flow rate of the air in the under-hood.

As another example, when the processor controls the air flap or the cooling fan according to the rule-based map, the processor may control the air flap to be closed to raise the oil temperature of the engine or the water temperature of the engine during the cold start.

As another example, when the processor controls the air flap or the cooling fan according to the rule-based map, the processor may control the air flap to be opened when the oil temperature of the engine or the water temperature of the engine is higher than the specific temperature.

As another example, when the processor controls the air flap or the cooling fan according to the rule-based map, the processor may perform a control to increase the rotational speed of the cooling fan when the oil temperature of the engine or the water temperature of the engine is higher than the specific temperature regardless of the flow rate of the air in the under-hood.

As another example, when the processor controls the air flap or the cooling fan according to the rule-based map, it may operate the cooling fan at a constant speed regardless of the flow rate of the air in the under-hood.

According to an embodiment, when the air flap and the cooling fan are not normally controlled in association with each other (S710, NO) and are not normally controlled according to the rule-based map (S760, NO), the air flap or the cooling fan may be controlled in the safety mode.

For example, when the air flap or the cooling fan is not normally controlled in association with each other to minimize the total sum of the power consumption while securing the target air flow rate, and is not normally controlled by the rule-based map, the processor may determine that there is a problem with the control of the flap or the cooling fan.

In this case, the processor may perform a control to fix any one of a state, in which the air flap is opened, or a state, in which the air flap is closed, or fix any one of a state, in which the cooling fan is operated, or a state, in which the cooling fan is not operated.

For example, the processor may maintain the air flap in an opened state or operate the cooling fan at a constant speed regardless of the target air flow rate or the rule-based map. The processor may control the air flap or the cooling fan in the safety mode, by which the heat in the interior of the engine or the under-hood may be cooled down for safety even though energy is consumed unnecessarily due to the increased air resistance or the increase total sum of the power consumption.

Figure 8:
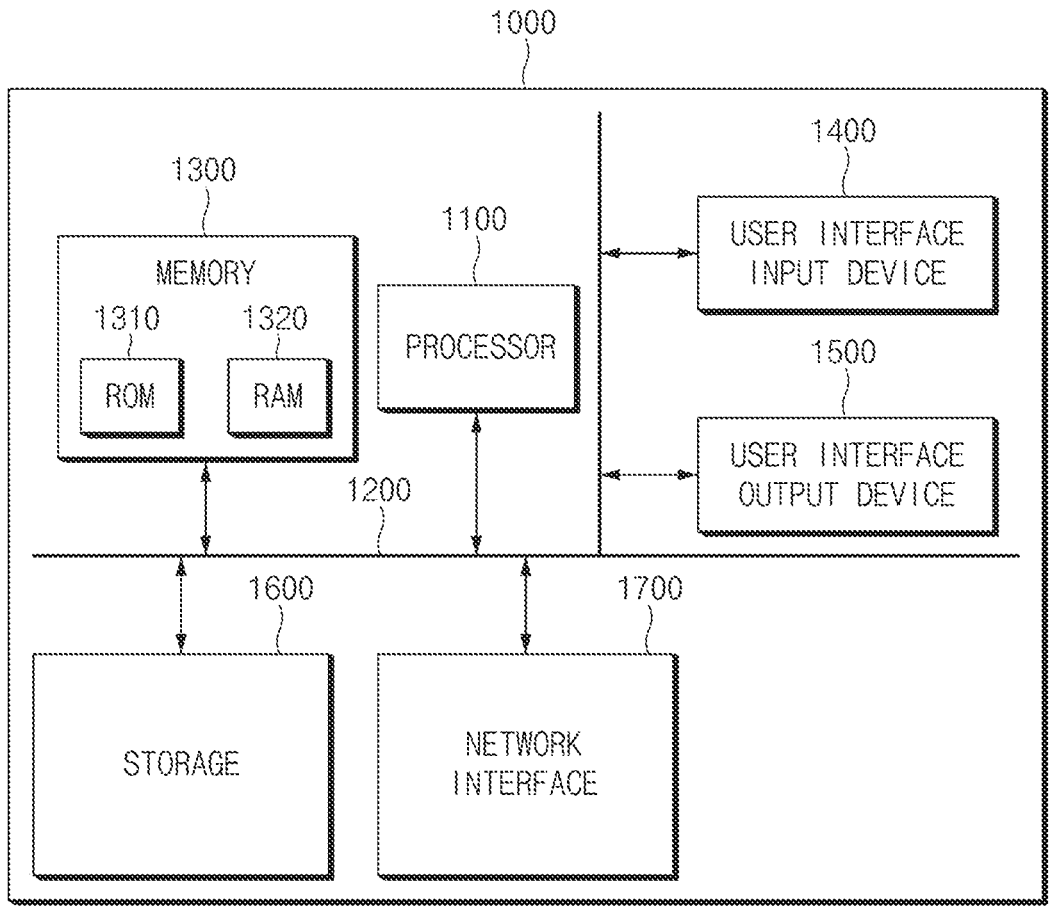
FIG. 8 is a computing system related to a vehicle control apparatus and a vehicle control method according to an embodiment of the present disclosure.

FIG. 8 illustrates a computing system related to the vehicle control apparatus or the vehicle control method according to an embodiment of the present disclosure.

Referring to FIG. 8, a computing system 1000 may include at least one processor 1100, a memory 1300, a user interface input device 1400, a user interface output device

1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

According to the present technology, the optimum control degree, by which the air flap and the cooling fan may be controlled with minimum power, may be calculated by not controlling the air flap and the cooling fan independently but controlling them in association with each other.

Furthermore, according to the present technology, the fuel efficiency or the electricity efficiency may be improved by operating the air flap or the cooling fan with minimum energy while securing the flow rate of the air that is necessary for the under-hood of the vehicle.

Furthermore, according to the present technology, the fuel efficiency or the electricity efficiency may be improved even when energy consumption due to the air conditioner is high, by controlling the air flap or the cooling fan in consideration of a load due to the operation of the air conditioner as well as a load due to the operation of the cooling fan.

In addition, various effects that are directly or indirectly recognized through the document may be provided.

The above description is a simple illustrative description of the technical spirit of the present disclosure, and the present disclosure may be variously modified and altered by an ordinary person in the art, to which the present disclosure pertains, without departing from the essential characteristics of the present disclosure.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle control apparatus comprising:
a memory configured to store program instructions; and
a processor configured to execute the program instructions, wherein the processor is configured to:
calculate a total sum of consumed power according to at least one of power consumed due to an air resistance, power consumed due to an operation of a cooling fan configured to increase flow of air introduced into an under-hood of a vehicle, or power consumed due to an operation of an air conditioner, or any combination thereof;
control at least one of an air flap configured to open and close an air inlet of the under-hood or a cooling fan, or any combination thereof such that the total sum of the consumed power is minimized in response to securing of a target air flow rate representing a flow rate of air required to pass through a condenser or a radiator of the air conditioner according to an operation of the vehicle; and
based on identification that at least one of the air flap or the cooling fan, or any combination thereof is not normally controlled such that the total sum of the consumed power is minimized in response to securing of the target air flow rate according to the operation of the vehicle,
control at least one of the air flap or the cooling fan, or any combination thereof according to a rule-based map set based on an input signal including a speed of the vehicle, an oil temperature of an engine, or a water temperature of the engine regardless of the target air flow rate.

2. The vehicle control apparatus of claim 1, wherein the target air flow rate is modeled based on a speed and a cooling requirement of the vehicle.

3. The vehicle control apparatus of claim 1, wherein the processor is configured to:
calculate a flow rate of air introduced into the under-hood of the vehicle based on a speed of the vehicle, an opening degree of the air flap, and an rpm of the cooling fan; and
control at least one of the air flap or the cooling fan, or any combination thereof such that the flow rate of the air introduced into the under-hood of the vehicle is the target air flow rate or higher.

4. The vehicle control apparatus of claim 1, wherein the processor is configured to:
calculate the power consumed due to the air resistance based on an air density, an air resistance coefficient, an area, by which a front surface of the vehicle is projected on a plane being perpendicular to a direction, in which the vehicle travels, and a speed of the vehicle.

5. The vehicle control apparatus of claim 1, wherein the processor is configured to:
calculate the power consumed due to the operation of the cooling fan based on an rpm of the cooling fan.

6. The vehicle control apparatus of claim 1, wherein the processor is configured to:
calculate a refrigerant pressure based on an outdoor temperature, a flow rate of the air introduced into the under-hood of the vehicle, and an opening degree of the air flap; and
calculate the power consumed due to the operation of the air conditioner based on the calculated refrigerant pressure.

7. The vehicle control apparatus of claim 1, wherein the processor is configured to:
based on identification that at least one of the air flap or the cooling fan, or any combination thereof is not normally controlled such that the total sum of the consumed power is minimized and is not normally controlled according to the rule-based map in response to securing of the target air flow rate, fix any one of a state, in which the air flap is opened, or a state, in which the air flap is closed, or fix any one of a state, in which the cooling fan is operated, or a state, in which the cooling fan is not operated.

8. The vehicle control apparatus of claim 1, wherein the processor is configured to:

calculate power, by which the total sum of the consumed power is minimized, as preset threshold power in response to the securing of the target air flow rate; and control at least one of the air flap or the cooling fan, or any combination thereof based on the preset threshold power.

9. The vehicle control apparatus of claim 1, wherein the processor is configured to:

control the air flap and the cooling fan in association with each other such that the total sum of the consumed power is minimized, in response to the securing of the target air flow rate while not controlling the air flap and the cooling fan independently.

10. A vehicle control method comprising:

calculating, by a processor, a total sum of consumed power according to at least one of power consumed due to air resistance, power consumed due to an operation of a cooling fan configured to increase flow of air introduced into an under-hood of a vehicle, or power consumed due to an operation of an air conditioner, or any combination thereof;

controlling, by the processor, at least one of an air flap configured to open and close an air inlet of the under-hood or a cooling fan, or any combination thereof such that the total sum of the consumed power is minimized in response to securing of a target air flow rate representing a flow rate of air required to pass through a condenser or a radiator of the air conditioner according to an operation of the vehicle; and based on identification that at least one of the air flap or the cooling fan, or any combination thereof is not normally controlled such that the total sum of the consumed power is minimized in response to securing of the target air flow rate according to the operation of the vehicle, controlling, by the processor, at least one of the air flap or the cooling fan, or any combination thereof according to a rule-based map set based on an input signal including a speed of the vehicle, an oil temperature of an engine, or a water temperature of the engine regardless of the target air flow rate.

11. The vehicle control method of claim 10, wherein the controlling, by the processor, of the at least one of the air flap configured to open and close the air inlet of the under-hood or the cooling fan, or any combination thereof such that the total sum of the consumed power is minimized in response to the securing of the target air flow rate representing the flow rate of the air required to pass through the condenser or the radiator of the air conditioner according to the operation of the vehicle includes:

modeling, by the processor, the target air flow rate based on a speed and a cooling requirement of the vehicle.

12. The vehicle control method of claim 10, wherein the controlling, by the processor, of the at least one of the air flap configured to open and close the air inlet of the under-hood or the cooling fan, or any combination thereof such that the total sum of the consumed power is minimized in response to the securing of the target air flow rate representing the flow rate of the air required to pass through the condenser or the radiator of the air conditioner according to the operation of the vehicle includes:

calculating, by the processor, a flow rate of air introduced into the under-hood of the vehicle based on a speed of the vehicle, an opening degree of the air flap, and an rpm of the cooling fan; and controlling, by the processor, at least one of the air flap or the cooling fan, or any combination thereof such that the flow rate of the air introduced into the under-hood of the vehicle is the target air flow rate or higher.

13. The vehicle control method of claim 10, wherein the calculating, by a processor, of the total sum of the consumed power according to the at least of the power consumed due to the air resistance, the power consumed due to the operation of the cooling fan configured to increase the flow of the air introduced into the under-hood of the vehicle, or the power consumed due to the operation of the air conditioner, or any combination thereof includes:

calculating, by the processor, the power consumed due to the air resistance based on an air density, an air resistance coefficient, an area, by which a front surface of the vehicle is projected on a plane being perpendicular to a direction, in which the vehicle travels, and a speed of the vehicle.

14. The vehicle control method of claim 10, wherein the calculating, by a processor, of the total sum of the consumed power according to the at least of the power consumed due to the air resistance, the power consumed due to the operation of the cooling fan configured to increase the flow of the air introduced into the under-hood of the vehicle, or the power consumed due to the operation of the air conditioner, or any combination thereof includes:

calculating, by the processor, the power consumed due to the operation of the cooling fan based on an rpm of the cooling fan.

15. The vehicle control method of claim 10, wherein the calculating, by a processor, of the total sum of the consumed power according to the at least of the power consumed due to the air resistance, the power consumed due to the operation of the cooling fan configured to increase the flow of the air introduced into the under-hood of the vehicle, or the power consumed due to the operation of the air conditioner, or any combination thereof includes:

calculating, by the processor, a refrigerant pressure based on an outdoor temperature, a flow rate of the air introduced into the under-hood of the vehicle, and an opening degree of the air flap; and calculating, by the processor, the power consumed due to the operation of the air conditioner based on the calculated refrigerant pressure.

16. The vehicle control method of claim 10, further comprising:

based on identification that at least one of the air flap or the cooling fan, or any combination thereof is not normally controlled such that the total sum of the consumed power is minimized and is not normally controlled according to the rule-based map in response to securing of the target air flow rate, fixing, by the processor, any one of a state, in which the air flap is opened, or a state, in which the air flap is closed, or fixing any one of a state, in which the cooling fan is operated, or a state, in which the cooling fan is not operated.

17. The vehicle control method of claim 10, wherein the controlling, by the processor, of the at least one of the air flap configured to open and close the air inlet of the under-hood or the cooling fan, or any combination thereof such that the total sum of the consumed power is minimized in response to the securing of the target air flow rate representing the flow rate of the air required to pass through the condenser or the radiator of the air conditioner according to the operation of the vehicle includes:

calculating, by the processor, power, by which the total sum of the consumed power is minimized, as preset threshold power in response to the securing of the target air flow rate; and controlling, by the processor, at least one of the air flap or the cooling fan, or any combination thereof based on the preset threshold power.

18. The vehicle control method of claim 10, wherein the controlling, by the processor, of the at least one of the air flap configured to open and close the air inlet of the under-hood or the cooling fan, or any combination thereof such that the total sum of the consumed power is minimized in response to the securing of the target air flow rate representing the flow rate of the air required to pass through the condenser or the radiator of the air conditioner according to the operation of the vehicle includes:

controlling, by the processor, the air flap and the cooling fan in association with each other such that the total sum of the consumed power is minimized, in response to the securing of the target air flow rate while not controlling the air flap and the cooling fan independently.

\* \* \* \* \*